Patented Jan. 28, 1941

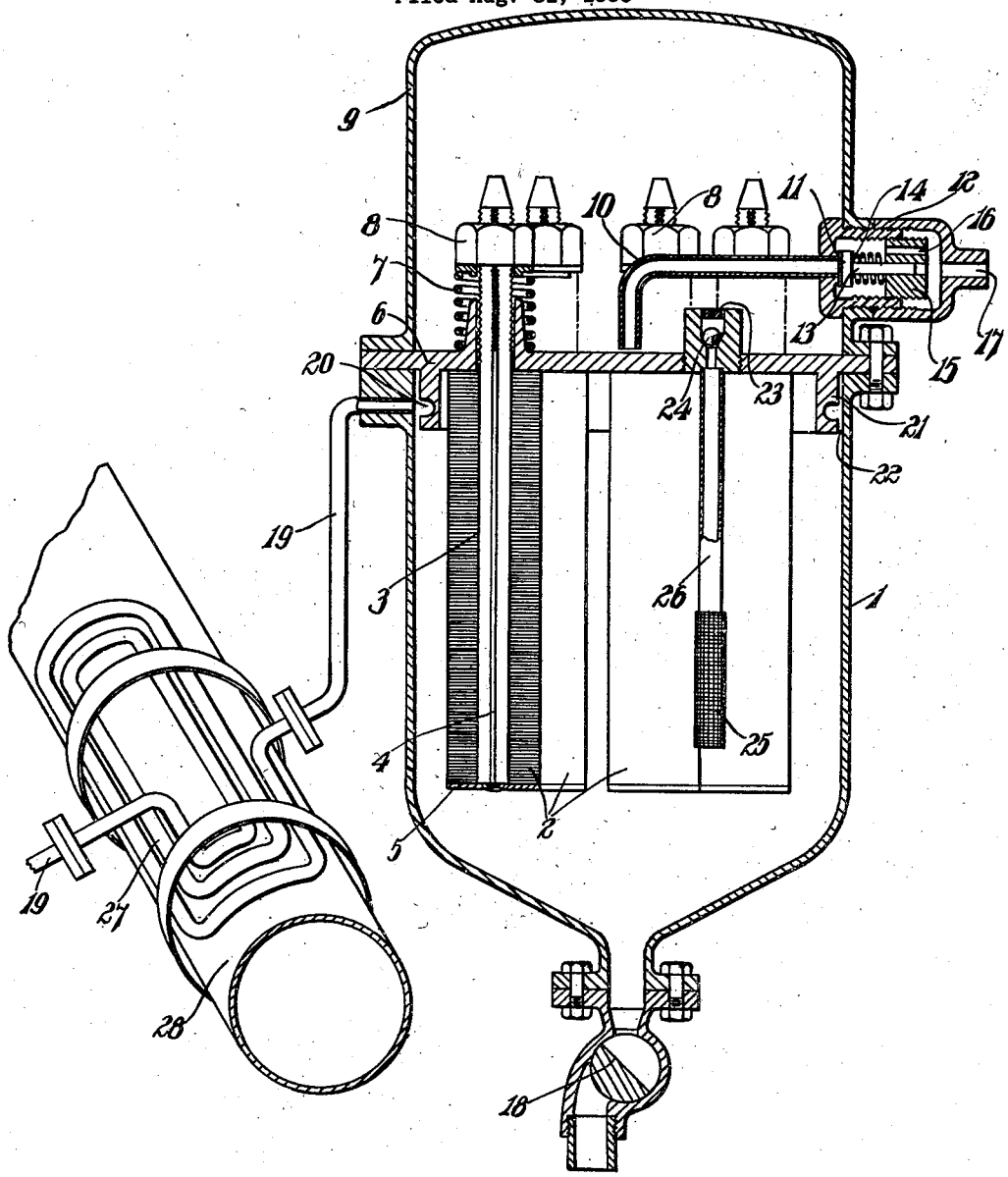

2,230,174

UNITED STATES PATENT OFFICE 2,230,174

FILTER

Albert Beale, Battersea, London, England

Application August 31, 1938, Serial No. 227,828
In Great Britain March 15, 1938

5 Claims. (Cl. 210—152)

This invention relates to filters for lubricating oil and has particular although not exclusive reference to filters used for this purpose on vehicles and locomotives, the object of the invention being to provide an improved construction and arrangement which can be readily cleansed to avoid the loss of efficiency through clogging and which is capable of being cleansed frequently without necessitating the renewal of essential components and without dismantling the filter.

The invention consists in a filtering apparatus for use in an oil circulation system wherein means are provided for creating an air pressure to cause deposit of accumulated solids from filtering elements whenever an engine and/or pump ceases to operate.

The invention also consists in a filtering apparatus for use in conjunction with oil circulation systems comprising one or more filters arranged within a closed chamber through which oil is forced and a second chamber through which the filtered oil is discharged and in which an air pressure is created sufficient to force oil back through the filter to remove therefrom accumulated solids when the circulating pump or the like ceases to operate.

The invention further consists in a filtering apparatus for use in an oil circulation system wherein filtered oil is discharged into a chamber in which an air lock is formed for the purpose of enabling air to be compressed in said chamber, which air, when the engine and/or pump operation ceases, automatically forces accumulated solids away from the filtering elements to collect in the base of the filter chamber.

Reference will now be made to the accompanying drawing which illustrates diagrammatically a filtering apparatus constructed according to the invention.

In the arrangement illustrated a filter vessel 1 encloses a number of filtering devices 2 which may be of any suitable known type but preferably consist each of an assembly of annular disc filtering elements enclosing a tubular passage 3 through which passes a rod 4 having a flange 5 at its lower end between which and the cover 6 of the filter vessel the said assembly of disc filtering elements is held in close relationship under the action of a spring 7 which surrounds the upper end of the rod 4 and whose compression is adjustable by means of a nut 8.

The oil discharged from the upper ends of the tubular passages 3 enters a chamber 9 which, in the example illustrated, is superimposed upon the cover 6 of the filter vessel but may be arranged to suit particular requirements as a separate unit. The oil can only leave this chamber to return to the engine sump by way of a pipe 10 provided with an outlet valve 11 disposed in a valve housing 12 detachably mounted in one side of the chamber 9. The outlet valve 11 is mounted on a stem 13 surrounded by a spring 14 which tends to urge the valve 11 on to its seating, the outer end of the spring abutting against a plug 15 having an outlet port or ports 16 and having screw threaded engagement with the wall of the valve housing so that by screwing the plug in or out it is possible to vary the compression of the spring 14 as desired. The oil passing through the port 16 leaves the valve housing through an outlet 17 to which is connected a conduit communicating with the engine sump.

The arrangement of the valve 11 as above described causes it to offer a certain amount of back pressure which is variable according to the degree of compression of the spring 14. This back pressure in conjunction with the fact that the outlet pipe 10 leads from a point near the bottom of the chamber 9 causes an air lock to be formed in the said chamber when the apparatus is functioning in the normal way, that is to say, while the engine is running. When the engine operation ceases the pressure on the oil inlet side falls and the air cushion which has been formed in the chamber 9 will expand forcing oil back through the passages 3 and the filter packs 2 to remove accumulated solids from the exterior of the filter packs 2 which solids settle in the form of a sludge in the base of the filter chamber 1 from which they can be removed periodically by opening an outlet valve 18.

In order to prevent this sludge in the base of the filter chamber from being stirred up by the flow of fresh oil into the chamber it is arranged that this oil to be treated shall be introduced without commotion at or near the upper end of the filter vessel and in the arrangement illustrated this is achieved by admitting the oil through a pipe 19 to an annular passage 20 formed around the exterior of an annular flange 21 which depends from the under side of the cover 6 and is of such dimensions as to leave a narrow annular passage 22 between its outer surface and the wall of the filter vessel 1. With this arrangement the incoming oil circulates around the passage 20 and enters the filter vessel around its wall in the form of an annular film.

In order to prevent the flow of oil through the filter vessel from being impeded at the commencement of operations by the relatively high viscosity of any body of cold oil retained in the vessel 1 a small jet 23 is provided in the cover 6 which in the form illustrated acts as a partition between the filter vessel 1 and the pressure chamber 9. This jet 23 works in parallel with the filter devices 2 and allows a flow of unfiltered oil to take place through the filter vessel with sufficient rapidity to ensure that incoming hot oil will quickly fill the filter vessel. On the other hand the dimensions of the jet 23 are sufficiently small to restrict the rate of flow of oil so that it is not detrimental to the engine.

Immediately below the jet 23 a non-return valve is provided, which may take the form of a ball 24, to prevent loss of air pressure in the chamber 9 when the engine stops running. To prevent the jet 23 becoming choked with solid matter contained in suspension in the oil a fine gauze strainer 25 is fitted over the lower end of a pipe 26 which supplies the jet, which pipe extends to a substantially central position in the filter vessel remote from the oil inlet.

As in most cases it is important to heat the oil for filtration the pipe 19 through which the oil reaches the filter vessel may be connected to a heating coil 27 fixed around the exterior of the exhaust manifold 28 or alternatively disposed within the said manifold.

The filter above described is so arranged that it draws dirty oil directly from the pressure side of an engine oil circulating pump through the pipe 19 and returns the filtered oil through a pipe connected to the outlet 17 to the engine sump at atmospheric pressure.

The air pressure which is built up during the filtering operations in the vessel 9 causes accumulated solids to be automatically removed from the filter devices 2 whenever the engine and/or pump ceases to operate and this arrangement possesses the advantage that it constitutes a means of concentrating in the base of the filter vessel 1 sludge which would otherwise be found after a few thousand miles travel in the engine sump and this sludge can be removed through the outlet 18 of the filter chamber much more easily than it could be removed from the sump of the engine at the same time avoiding loss of engine oil.

I claim:

1. In a filtering apparatus, a vessel divided into a lower inlet chamber and an upper, dome-like discharge chamber by a transverse partition, said inlet chamber having an inlet adjacent its upper portion and a sludge outlet adjacent the bottom thereof, a plurality of hollow filter packs having resilient means clamping them to the underside of said partition, the latter having openings placing said discharge chamber in fluid communication with the interior of said filter packs, the bottoms of said filter packs being closed and the sides thereof being constructed of a filtering material, and an oil outlet leading from a point near the bottom of said discharge chamber to trap air in the upper portion of said discharge chamber and having means for resisting the discharge of oil therefrom, to thereby develop air pressure in the discharge chamber operative to cause reverse flow of oil through said side walls of said filter packs and dislodge solids accumulated thereon and deposit them toward the sludge outlet in said inlet chamber.

2. The filtering apparatus defined in claim 1, wherein means including a check valve is mounted directly on said partition and is operable to permit restricted oil flow through a filtering means located in said inlet chamber from said inlet chamber to said discharge chamber, but prevents flow in the opposite direction.

3. The filtering apparatus defined in claim 1, wherein said resilient means comprises a rod passing through each of said filter packs and said openings in said partition and connected at its lower end to the closed bottom thereof and having an abutment at its upper end located in said discharge chamber, and a compression spring acting against each of said abutments and reacting against the upper side of said partition.

4. A filtering apparatus comprising a vessel having a transverse partition dividing said vessel into a lower inlet chamber having a sludge outlet in its lower portion and an upper closed discharge chamber above said partition, said partition having a plurality of openings therein, a plurality of hollow filter packs supported on said partition over said openings and having means for maintaining them in sealing relationship with the underside of said partition, said filter packs projecting downwardly into the inlet chamber and providing passages therethrough for the flow of oil from the inlet chamber through said openings to the discharge chamber, and an oil outlet leading from a point near the bottom of the discharge chamber to trap air in the upper portion of the discharge chamber and having yieldably movable means to resist the discharge of oil therefrom and thereby develop air pressure in the discharge chamber operative to cause reverse flow of oil through the filter packs to dislodge solids accumulated thereon and deposit them toward the sludge outlet in the inlet chamber.

5. A filtering apparatus comprising a vessel having a transverse partition dividing it into a lower inlet chamber having a sludge outlet in its lower portion and an upper closed discharge chamber above said partition, filter packs supported on said partition and projecting downwardly into the inlet chamber and providing passages therethrough for the flow of oil from the inlet chamber to the discharge chamber, an oil inlet leading into a side of the inlet chamber near its upper portion, said partition having an annular flange depending therefrom and extending around the filter packs in close proximity to the wall of the inlet chamber and having a circumferential groove which communicates with the oil inlet, and an oil outlet leading from a point near the bottom of the discharge chamber to trap air in the upper portion of the discharge chamber and having means to resist the discharge of oil therefrom and thereby develop air pressure in the discharge chamber operative to cause reverse flow of oil through the filter packs to dislodge solids accumulated thereon and deposit them toward the sludge outlet in the inlet chamber.

ALBERT BEALE.